United States Patent
Ekambaram et al.

(10) Patent No.: US 10,048,790 B2
(45) Date of Patent: Aug. 14, 2018

(54) DIGITAL OBJECT SHARING USING A FLEXIBLE DISPLAY

(71) Applicant: International Business Machines Corporation, Armonk, NY (US)

(72) Inventors: Vijay Ekambaram, Tamilnadu (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/070,176

(22) Filed: Mar. 15, 2016

(65) Prior Publication Data
US 2017/0269806 A1    Sep. 21, 2017

(51) Int. Cl.
G06F 3/0488    (2013.01)
G06F 3/041     (2006.01)

(52) U.S. Cl.
CPC ........ *G06F 3/0414* (2013.01); *G06F 3/04883* (2013.01); *G06F 2203/04102* (2013.01)

(58) Field of Classification Search
CPC ................... G06F 2203/04102; G06F 3/0488
See application file for complete search history.

(56) References Cited

U.S. PATENT DOCUMENTS

| | | |
|---|---|---|
| 8,312,392 B2 | 11/2012 | Forutanpour et al. |
| 8,466,873 B2 | 6/2013 | Vertegaal et al. |
| 9,055,404 B2 | 6/2015 | Setlur et al. |
| 9,110,516 B2 | 8/2015 | Hwang |
| 2011/0083111 A1* | 4/2011 | Forutanpour ......... G06F 1/1694 715/863 |
| 2012/0026113 A1* | 2/2012 | Kasahara ............. G06F 3/0482 345/173 |
| 2014/0085184 A1 | 3/2014 | Vertegaal et al. |
| 2014/0149881 A1 | 5/2014 | Cheng et al. |
| 2014/0184490 A1* | 7/2014 | Oh .......................... G06F 3/002 345/156 |
| 2015/0149964 A1* | 5/2015 | Bernstein ............ G06F 3/04815 715/836 |

FOREIGN PATENT DOCUMENTS

EP    2483811 A2    8/2012

OTHER PUBLICATIONS

IBM, "Display Technology", IBM Research, IBM®, printed on Jan. 27, 2016, 1 page, <https://www.research.ibm.com/cross_disciplines/display_tech.shtml>.

(Continued)

*Primary Examiner* — Dennis Joseph
(74) *Attorney, Agent, or Firm* — James H. Mayfield; Arnold B. Bangali (57) ABSTRACT

As disclosed herein a computer-implemented method includes detecting a gesture applied to a touch display that corresponds to an object, determining a direction for the gesture and determining if a gesture pressure is greater than a threshold pressure required to move the object. The method further includes determining a surface profile of the display and selecting a rate of transfer according to the surface profile of the display, determining if a surface profile of a receiving device is compatible with the surface profile of the display, and transferring the object to the receiving device. A computer program product and a computer system corresponding to the above method are also disclosed herein.

15 Claims, 6 Drawing Sheets

(56) References Cited

OTHER PUBLICATIONS

"File Transfer", Android Apps on Gogle Play, Google, printed on Jan. 27, 2016, 3 pages, <https://play.google.com/store/apps/details?id=com.delitestudio.filetransferfree&hl=en>.

"Shares files, get feedback and take projects from concept to completion", © 2015 Hightail, 4 pages, <https://www.hightail.com/>.

"Send Large Files", Want to send large files? We've got the answer., DropSend—Email large files and send large files, © 2016 Registered in England, 4 pages, <http://www.dropsend.com/>.

"WeTransfer", printed on Jan. 27, 2016, 3 pages, <https://www.wetransfer.com/>.

\* cited by examiner

DIGITAL OBJECT SHARING USING A FLEXIBLE DISPLAY

BACKGROUND

The present invention relates to flexible display technology, and more particularly to digital object sharing using a flexible display technology.

With the development of display technology in the computing industry, a variety of display technologies are available. Examples include liquid crystal displays (LCD), thin-film-transistor liquid crystal displays (TFT LCD), light-emitting diode (LED) displays, and flexible active matrix organic light-emitting diode (FAMOLED) displays. A flexible display made of a flexible material such as plastic, as opposed to an inflexible glass substrate, can maintain display performance even when it is flexed, bent, or rolled. The flexible display is easy to carry by folding or rolling up since the flexible display is not damaged when it is folded or rolled up like paper.

SUMMARY

As disclosed herein a computer-implemented method includes detecting a gesture applied to a touch display that corresponds to an object, determining a direction for the gesture and determining if a gesture pressure is greater than a threshold pressure required to move the object. The method further includes determining a surface profile of the display and selecting a rate of transfer according to the surface profile of the display, determining if a surface profile of a receiving device is compatible with the surface profile of the display, and transferring the object to the receiving device. A computer program product and a computer system corresponding to the above method are also disclosed herein.

DETAILED DESCRIPTION

Computing devices typically have a display that enables users to communicate with the computing devices. In the past, displays were typically view only devices (e.g., monitors) that enabled users to view echoed input from input devices (e.g., keyboards), and to view results from operations performed on the associated computing devices. With the introduction of touch displays, two-way communications between users and computing devices were enabled using only the touch displays. Using finger gestures on the touch displays, the users are able to perform operations previously performed using devices like attached keyboards and mice. For example users may: (i) provide typed input using virtual keyboards presented on the touch displays; (ii) use their finger to drag objects (e.g., files, documents, or photos) from one location on the touch displays (e.g., the desktop) to another location on the touch displays (e.g., a folder in a file system); (iii) use their finger to push (flick) objects (e.g., files, documents, or photos) to other devices that are visible to the touch displays (e.g., other computers, smart devices, or printers).

The embodiments disclosed herein recognize that flexible touch displays (hereinafter flexible displays) may remain operational while being contorted (e.g., bent, folded, rolled, etc.). As previously mentioned, users may use gestures to flick objects from flexible displays to target (receiving) devices that are visible to the flexible displays. Probable target devices for flicked objects may be determined using the spatial orientation of the flexible displays and the direction of the flick gestures. When the objects are transferred to the receiving devices, there may be more than one communication channel available between the flexible displays and the receiving devices. The various communication channels may use different communication technologies (e.g., WIFI, Bluetooth®, ZigBee®, and WiMax™) that may provide different data transfer rates (speeds). Often, the users have little or no input in determining the transfer rate when objects are transferred from the flexible displays to a receiving devices. Additionally, the users may not be able to easily prevent all transfer of data (both to or from the flexible displays) without disconnecting from the network.

The embodiments disclosed herein recognize that users may find it advantageous to disable data transfer. Additionally, users may also find it advantageous to choose a data transfer speed (and communication technology) when data transfer is enabled. The present invention leverages the above observations and will now be described in detail with reference to the Figures.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Figure 1:
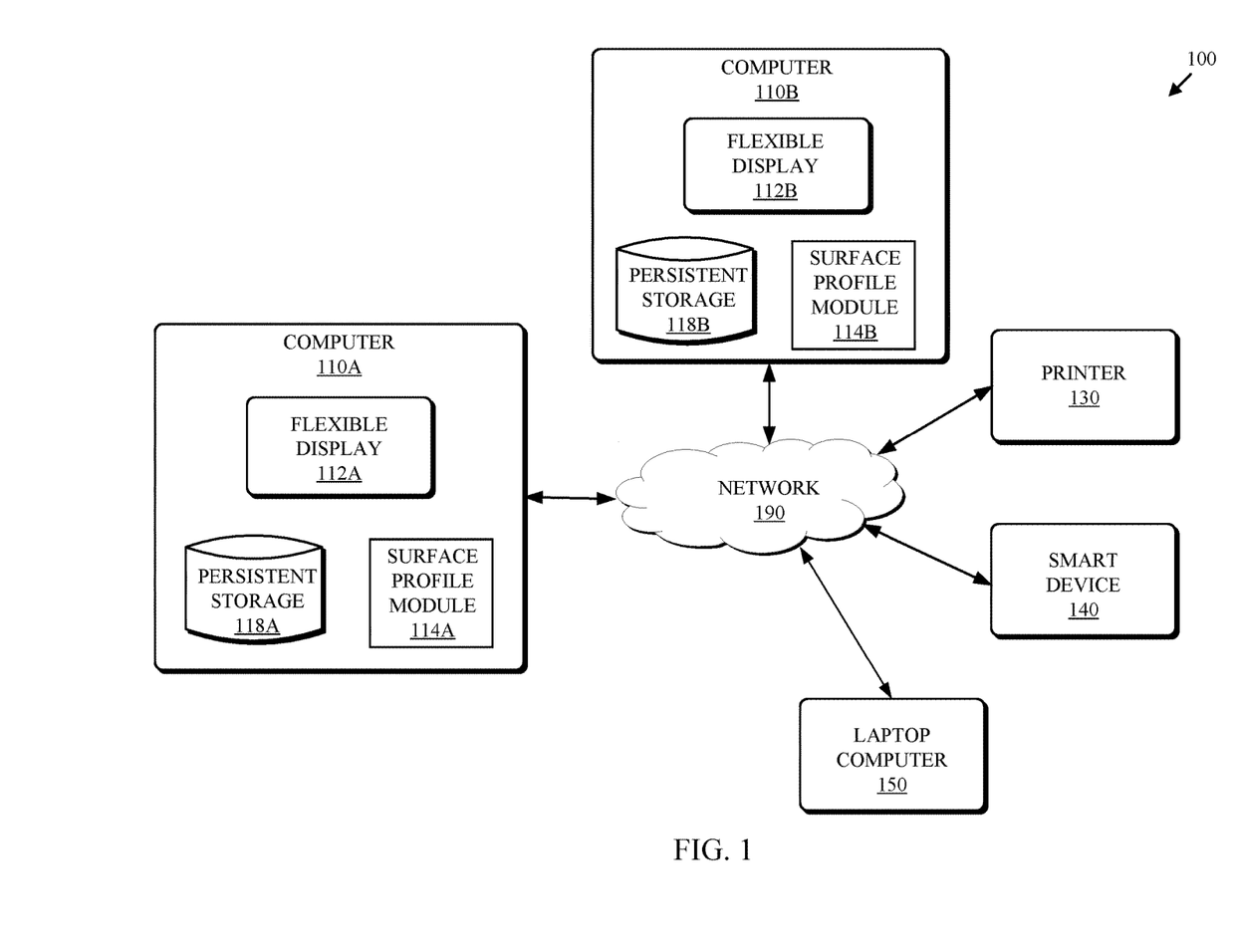
FIG. 1 is a functional block diagram depicting a computing environment, in accordance with at least one embodiment of the present invention.

FIG. 1 is a functional block diagram depicting a computing environment 100, in accordance with at least one embodiment of the present invention. Computing environment 100 includes computer 110A, computer 110B, printer 130, smart device 140, and laptop computer 150 that communicate with each other over network 190. As disclosed herein, computer 110A is a sending device (e.g., sending data over network 190), and computer 110B, printer 130, smart device 140, and laptop computer 150 are receiving devices (e.g., receive data from network 190).

Computer 110A and computer 110B can be computing devices such as smart phones, tablets, desktop computers, laptop computers, specialized computer servers, or the like that are capable of processing instructions and communicating over network 190. In general, computer 110A and computer 110B are representative of any electronic devices, or combination of electronic devices, capable of executing machine-readable program instructions, as described in greater detail with regard to FIG. 5.

As depicted, computer 110A includes flexible display 112A, surface profile module 114A and persistent storage 118A. Computer 110B includes flexible display 112B, surface profile module 114B and persistent storage 118B. Flexible display 112 may be able to be bent, folded, and rolled similar to a piece of paper. Surface profile module 114 may be configured to detect the surface profile of flexible display 112. Surface profile module 114 may detect that one or more edges of flexible display 112 are bent at various angles. Surface profile module 114 may also detect a sink (e.g., a crevice or dip) in flexible display 112.

Additionally, surface profile module 114 may be configured to use the surface profile corresponding to flexible display 112 to control the movement of objects (e.g., documents, photos, video files, music files, and the like) within computer 110A. Surface profile module 114 may also be configured to control the movement of objects, over network 190, to other devices (i.e., computer 110B, printer 130, smart device 140, or laptop computer 150) on network 190. Surface profile module 114 is depicted on computer 110, however, surface profile module 114 may reside on flexible display 112 or on some other device accessible over network 190.

Surface profile module 114 may store profile information on persistent storage 118. Persistent storage 118 may be any non-volatile storage device or media known in the art. For example, persistent storage 118 can be implemented with a tape library, optical library, solid state storage, one or more independent hard disk drives, or multiple hard disk drives in a redundant array of independent disks (RAID). Similarly, data on persistent storage 128 may conform to any suitable storage architecture known in the art, such as a file, a relational database, an object-oriented database, and/or one or more tables.

Computer 110A, computer 110B, printer 130, smart device 140, laptop computer 150, and other electronic devices (not shown) communicate over network 190. Network 190 can be, for example, a local area network (LAN), a wide area network (WAN) such as the Internet, or a combination of the two, and include wired, wireless, or fiber optic connections. In general, network 190 can be any combination of connections and protocols that will support communications between computer 110A, computer 110B, printer 130, smart device 140, and laptop computer 150 in accordance with at least one embodiment of the present invention.

Figure 2:
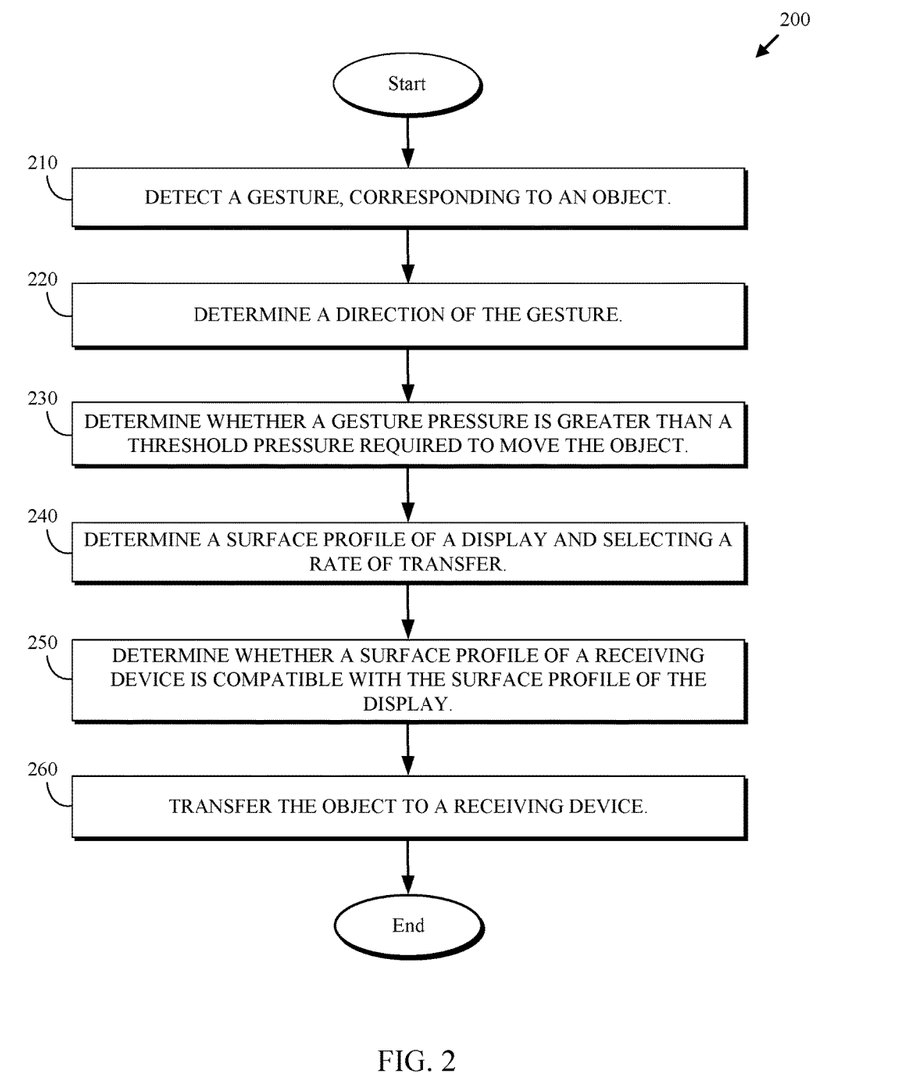
FIG. 2 is a flowchart depicting a surface profile method, in accordance with at least one embodiment of the present invention.

FIG. 2 is a flowchart depicting surface profile method 200, in accordance with at least one embodiment of the present invention. As depicted, surface profile method 200 includes detecting (210) a gesture, determining (220) a direction of the gesture, determining (230) a gesture pressure, determining (240) a surface profile of a display, determining (250) whether a surface profile of a receiving device is compatible, and transferring (260) the object to a receiving device. Surface profile method 200 enables a user to control the effect of a gesture on an object on a flexible display.

Detecting (210) a gesture may include surface profile module 114 detecting a user touching a flexible display (e.g., flexible display 112A). A gesture may include touching flexible display 112A with one or more fingers, a stylus, or a hand. An object that is displayed on flexible display 112A (e.g., a document, a photo, a video, etc.,) may be the target of the gesture, for example, a gesture may begin and/or end by a finger touching an object on flexible display 112A.

Determining (220) a direction of the gesture may include surface profile module 114 detecting movement associated with the gesture. If the gesture includes movement of a finger on flexible display 112A, then surface profile module 114 may detect and analyze the movement to determine a direction of the movement (i.e., the direction of the gesture). In some embodiments, surface profile module 114 detects the point on flexible display 112A where a gesture begins and the point on flexible display 112A where the gesture ends. Surface profile module 114 then calculates the direction of the gesture based on the starting and ending points. In other embodiments, surface profile module 114 detects the point on flexible display 112A where a gesture begins and continually maps points (coordinates) during the act of the gesture, and then mathematically calculates the direction of the gesture based on the mapped points.

Determining (230) a gesture pressure may include surface profile module 114 receiving information from sensors embedded in flexible display. In some embodiments, each sensor throughout flexible display 112A continually provides pressure information to surface profile module 114 and surface profile module 114 detects gesture pressure as data received from the sensors changes. In other embodiments, pressure information is provided to surface profile module 114, by one or more sensors throughout flexible display 112A, only when a gesture is detected on flexible display 112A. As the finger performing the gesture presses harder against flexible display 112A, the gesture pressure detected by surface profile module 114 increases.

Computing devices often contain objects (e.g., files, applications, documents, photos, etc.) that are confidential or sensitive in nature, and should not be accidentally sent to other devices. In some embodiments, objects stored on a computing device (e.g., computer 110A) are assigned a threshold weight that is determined based on the level of sensitivity or confidentiality of the object (e.g., the more sensitive or confidential the object, the larger/heavier the threshold weight value). In some embodiments, as the weight associated with an object increases, the amount a gesture pressure required to move the object on flexible display 112 also increases. When the pressure on flexible display 112 reaches a threshold pressure, the object may be moved. Requiring a gesture with additional pressure (e.g. greater than or equal to a threshold pressure) to move sensitive data may prevent accidental (unintentional) transfer (e.g., sharing) of the sensitive data.

In some embodiments, the weight associated with an object is calculated using a customizable algorithm using user-defined rules. User defined rules may include additional weight for confidential files and files containing private information. In other embodiments, the weight associated with an object is manually set by a user. In some embodiments, weight associated with an object can range from 0-100. A public access file (e.g., a screensaver photo) has a weight of zero and can be easily moved. A confidential document that should only be shared (or printed) on a need to know basis has a weight of 75 and requires significant gesture pressure to move the document. A restricted file (e.g., a password registry file) that should never be shared has a weight of 100 and is unable to be moved (preventing accidental sharing of this information).

Determining (240) a surface profile of a display may include surface profile module 114A analyzing flexible display 112A to identify characteristics of flexible display 112A. In some embodiments, surface profile module 114A uses software implemented compasses to determine the spatial orientation of flexible display 112A (e.g., the right edge of flexible display 112A is pointing 90° east). In some embodiments, surface profile module 114A is configured to detect how the surface of flexible display 112A is positioned or shaped. Flexible display 112A may lie on a desk or hang vertically in a flat configuration, or flexible display 112A may be bent, folded, and rolled into various configurations. Determining a surface profile includes identifying the current shape (i.e., the angle of incline of an edge of the touch display in the direction of a gesture) and spatial orientation of flexible display 112A.

In some embodiments, an object can be transferred from computer 110A to another receiving device using a flicking gesture on flexible display 112A. A flicking gesture may include touching an object on flexible display 112A with a finger, and quickly moving the finger in the direction of the device to which the object is to be transferred. In some embodiments, transfer of objects from computer 110A to another device, over network 190, is controlled using the bending properties of flexible display 112A, as identified in a surface profile corresponding to flexible display 112A. In some embodiments, the incline of flexible display 112A (i.e., the steepness of the bend of flexible display 112A) in the direction of the flick gesture controls the transfer speed of the object to the receiving device. In some embodiments, transfer speed is altered by the use of different communication channels between computer 110A and a receiving device.

As the steepness of the incline increases, transfer speed decreases. If the bend in flexible display 112A becomes vertical or is bent past vertical, then transfer is not permitted to or from flexible display 112A in the direction of the bend. Using physical objects such as a ball (as the object to be transferred) and an ramp (as the flexible display) as an example: (i) rolling a ball along a flat surface the ball move from point A to point B at a rapid speed; (ii) placing a slightly inclined ramp in the path of the ball causes the movement of the ball from point A to point B to slow slightly; (iii) placing a steep (large incline) ramp in the path of the ball causes the movement of the ball from point A to point B to be much slower than the slightly inclined ramp; and (iv) placing a wall (90° bend) between point A and point B prevents the ball from moving to point B.

Much like the degree of incline of a ramp affected the speed of the ball in the previous example, the degree of incline of flexible display 112A may be used to control the speed of data transfer between a sending device (computer 110A) and a receiving device. In some embodiments, the user can control the file transfer rate by changing the degree of incline of flexible display 112A in the direction of the gesture. For example, the user can: (i) instantaneously pause a current file transfer by bending flexible display 112A, along the edge intersecting with the direction of a gesture, perpendicular to the natural flat orientation of flexible display 112A; and (ii) instantaneously change the communication channel during file transfer by adjusting the degree of incline of flexible display 112A along the edge intersecting with the direction of a gesture. In some embodiments, the communication channel and transfer speed associated with the degree of incline are provided to the user as user readable data on flexible display 112A. In other embodiments, all available communication channels and transfer speeds between a sending and receiving device are presented on flexible display 112A, with the communication channel and transfer speed currently in use clearly identified. If the degree of incline of flexible display 112A changes causing the communication channel and transfer speed to change, the change will be visible on flexible display 112A. In some embodiments, the surface profile includes a mapping communication channels to of degrees of incline on flexible display 112A.

The surface profile corresponding to flexible display 112A may indicate that a sink (e.g., a crevice or dip) exists on flexible display 112A. In some embodiments, a sink is used to collect objects. The collection may be an intermediate object that is later moved to a receiving destination on computer 110A or a receiving device. In some embodiments, the collection is created by compressing the objects collected in the sink (e.g., ZIP file, TAR file, EAR file, JAR file, RAR file, etc.). In some embodiments, the collection is moved to a final destination by an additional gesture. In other embodiments, the collection continues to move to a final destination (as a result of a previous gesture) when the sink is removed (e.g. flattened).

Determining (250) whether a surface profile of a receiving device is compatible may include surface profile module 114A determining if the receiving device includes a flexible display (e.g., flexible display 112B on computer 110B). In some embodiments, if a receiving device (e.g., computer 110B) includes a flexible display (e.g., flexible display 112B), the surface profile corresponding to flexible display 112B is provided by surface profile module 114B to surface profile module 114A. After analyzing the surface profile of the receiving device, surface profile module 114A may determine if the bending configuration of flexible display 112B is compatible with the bending configuration of flexible display 112A.

If surface profile module 114A determines that the surface profile corresponding to flexible display 112B is compatible, the computer 110A and computer 110B automatically pair (e.g., establish a link between the devices to allow communications between them) and computer 110B may be an acceptable receiving device for a transfer operation. Surface profile module 114A may determine that the surface profile corresponding to flexible display 112B is not compatible and therefore computer 110B is not an acceptable receiving device for computer 110A. A profile may not be compatible if the flexible display is bent vertically (e.g., a 90° angle) preventing any data transfer. Additionally, the surface profile of flexible display 112B may not include any communication channels that are compatible with the surface profile corresponding to flexible display 112A.

The possibility exists that flexible display 112B may be compatible with flexible display 112A. However flexible display 112B is currently configured (bent) to connect to a different communication channel than flexible display 112A. In some embodiments, surface profile module 114A alters (e.g., overrides) the communication channel used by flexible display 112A to be the same communication channel used by flexible display 112B, enabling data transfer between flexible display 112A and flexible display 112B.

In some embodiments, receiving devices that do not include a flexible display (e.g., printer 130, smart device 140, and laptop computer 150) are verified as either compatible or incompatible receiving devices. If surface profile module 114A determines that a receiving device without a flexible display is compatible, the receiving device automatically pairs with computer 110A and may be an acceptable receiving device for a transfer operation.

Transferring (260) the object to a receiving device may include surface profile module 114A determining which receiving devices are visible within a calculated area of visibility. In some embodiments, the area of visibility is identified as the space between the tangential compass direction of the edge of the flexible display and the direction of a gesture. In other embodiments, the area of visibility includes any devices physically located off the edge of the flexible display toward which the gesture was directed. The area of visibility will be described in greater detail with respect to FIG. 4B.

Any devices that are visible within the area of visibility may be potential receiving devices. In some embodiments, each device is be verified as either compatible or incompatible with computer 110. In some embodiments any receiving devices within the area of visibility that are compatible are displayed to the user on flexible display 112A. In some embodiments, a user can choose (by a touching gesture) one device to receive the transferred data (object). In other embodiments, a user can choose (by a touching gesture) one or more devices to receive the transferred data. Additionally, the user may adjust the incline of the bend in flexible display 112A to alter the communication channel/transfer speed used to transfer the data to the selected receiving device.

Figure 3A:
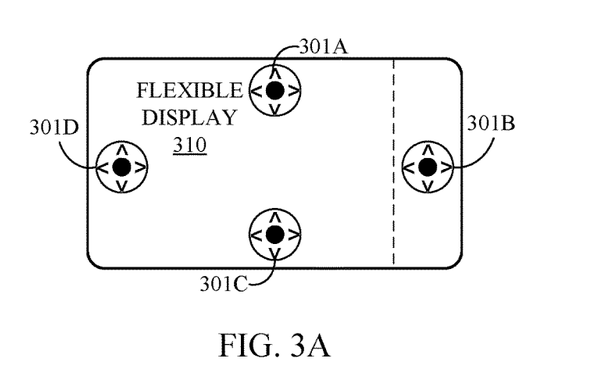
FIG. 3A depicts an example flexible display detecting spatial orientation, in accordance with at least one embodiment of the present invention.

FIG. 3A flexible display 310 detecting spatial orientation, in accordance with at least one embodiment of the present invention. As depicted, flexible display 310 includes four software compasses (i.e. compass 301A, compass 301B, compass 301C, and compass 301D) each determining the spatial orientation of an edge of flexible display 310. Flexible display 310 may be folded, bent, twisted, or rolled into a various configurations, and using a compass on each edge of flexible display 310 may enable a surface profile module (e.g., surface profile module 114) to determine the tangential direction of teach edge of flexible display 310.

FIGS. 3B-3E depict flexible display 310 with different surface profiles, in accordance with at least one embodiment of the present invention. FIGS. 3B-3E each depict flexible display 310, on which gesture 330 (e.g., a flicking gesture) is used to move an object in a in direction-of-travel 332 on flexible display 310. Each of FIGS. 3B-3E depict flexible display 310 with a different surface profile.

Figure 3B:
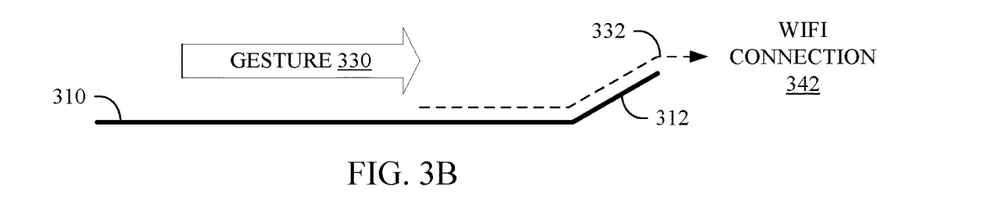
FIGS. 3B-3E depict a flexible display with different surface profiles, in accordance with at least one embodiment of the present invention.
Figure 3C:
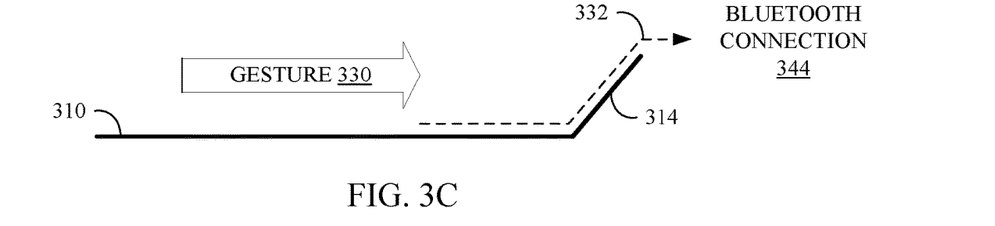

FIG. 3B depicts flexible display 310 with slight incline 312 in the path of direction-of-travel 332. The surface profile module corresponding to flexible display 310 determines that slight incline 312 is mapped to wifi connection 342, and the object of gesture 330 may be transferred using wifi connection 342. FIG. 3C depicts flexible display 310 with steep incline 314 in the path of direction-of-travel 332. The surface profile module corresponding to flexible display 310 determines that steep incline 314 is mapped to Bluetooth® connection 344, and the object of gesture 330 may be transferred using Bluetooth® connection 344. If the incline of the incline (e.g., slight incline 312 or steep incline 314) were to change, then a different communication channel may be used to transfer data moving in direction-of-travel 332.

Figure 3D:
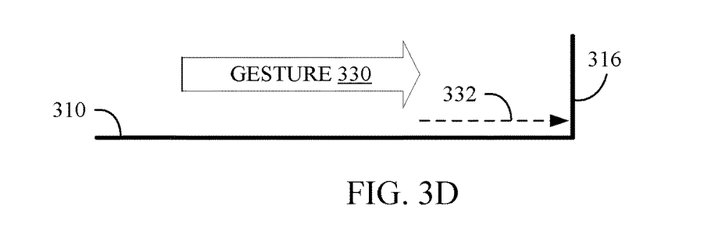

FIG. 3D depicts flexible display 310 with vertical bend 316 in the path of direction-of-travel 332. The surface profile module corresponding to flexible display 310 determines that vertical bend 316 prevents any transfer of data along the path of direction-of-travel 332. As a result the object acted on by gesture 330 is unable to be transferred.

Figure 3E:
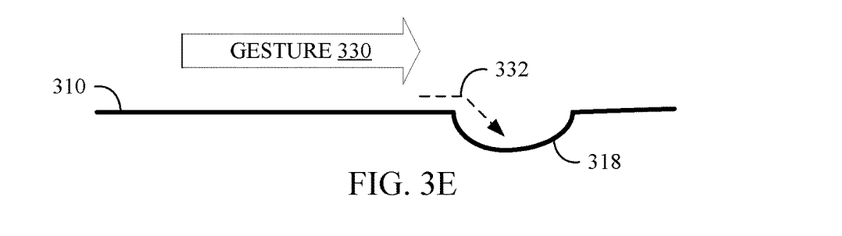

FIG. 3E depicts flexible display 310 with sink 318 in the path of direction-of-travel 332. The surface profile module corresponding to flexible display 310 determines that the object acted on by gesture 330 may be collected in sink 318. Subsequent objects that move in direction-of-travel 332 may also be collected in sink 318. In some embodiments the objects (items) in sink 318 are packaged into a collection object (e.g., ZIP file, TAR file, EAR file, JAR file, RAR file, etc.). When the user wishes to move the collection object, the user may use a gesture. In some embodiments, the user removes sink 318 from flexible display 310 to enable the collection object to be the object of a gesture. In other embodiments, the collection object may be removed from sink 318 without altering the surface profile of flexible display 310.

Figure 4A:
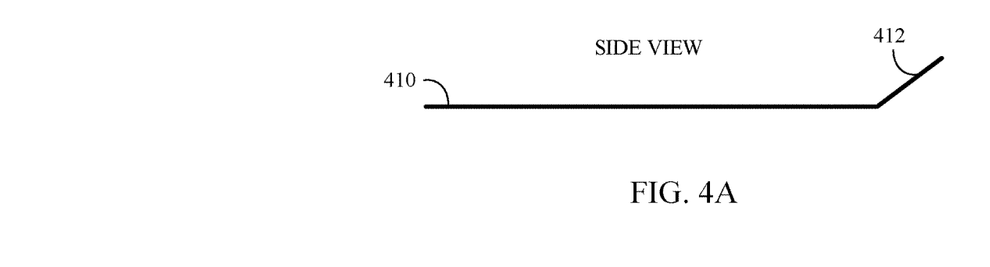
FIGS. 4A-4C depict a flexible display detecting available wireless devices, in accordance with at least one embodiment of the present invention.
Figure 4B:
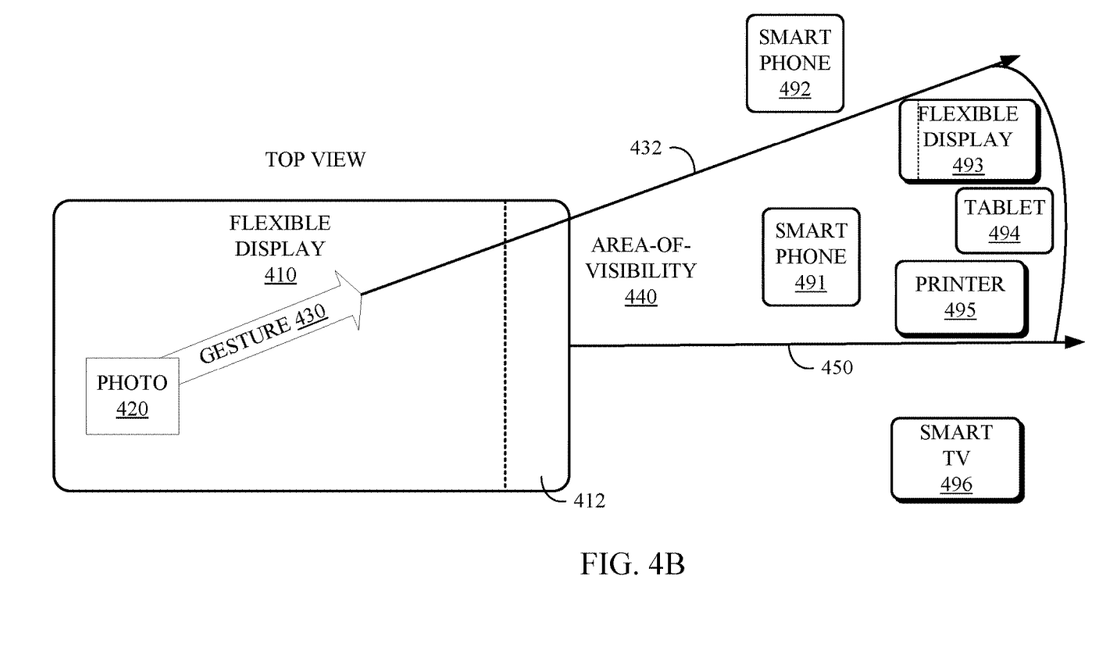
Figure 4C:
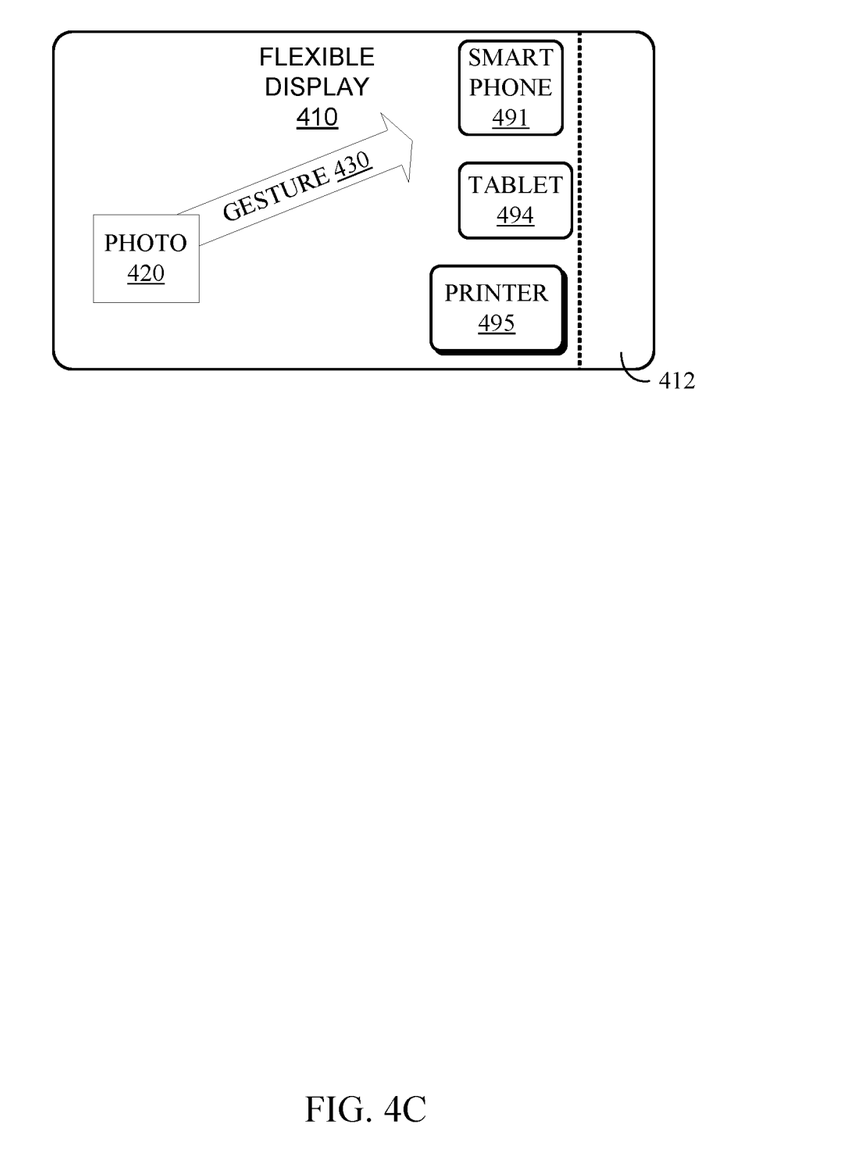

FIGS. 4A-4C depict flexible display 410 detecting available wireless devices, in accordance with at least one embodiment of the present invention. FIG. 4A depicts a side view of flexible display 410 and provides a visual representation of incline 412 that is detected and analyzed by a surface profile module corresponding to flexible display 410. FIG. 4B depicts a top view of flexible display 410. A user wishes to send a copy of photo 420 to a co-worker's smart phone 491. The user touches photo 420 with his finger, and uses a flicking gesture (gesture 430) to flick the photo in the direction of his co-worker (who is in possession of smart phone 491).

A surface profile module corresponding to flexible display 410 is responsible for detecting any devices that may be potential recipients (i.e., receiving devices) of photo 420. Potential receiving devices must reside in area-of-visibility 440. Area-of-visibility 440 is the space defined by the area between direction-of-travel 432 and tangential direction 450 (i.e., the tangential direction of the edge of flexible display 410 over which direction-of-travel 432 passes). Area-of-visibility 440 may include any devices in a 3D area (e.g., including the space from the floor to the ceiling to the floor, between direction-of-travel 432 and tangential direction 450, within the current room).

FIG. 4B depicts available smart phone 491, smart phone 492, flexible display 493, tablet 494, printer 495, and smart TV 496. A surface profile module corresponding to flexible display 410 determines that smart phone 491, flexible display 493, tablet 494, and printer 495 are within area-of-visibility 440. The surface profile module corresponding to flexible display 410 receives surface profile information corresponding to flexible display 493 and determines that flexible display 493 is bent vertically, and can not receive data from flexible display 410. Smart phone 491, tablet 494, and printer 495 are the potential receiving devices in area-of-visibility 440 that are available to receive photo 420.

FIG. 4C depicts flexible display 410 after the surface profile module corresponding to flexible display 410 has determined potential receiving devices for photo 420. As depicted, icons representing each potential receiving device are displayed on flexible display 410. The user uses a touching gesture to select the receiving device (e.g., smart phone 491) to which photo 420 is to be transferred. In some embodiments, the user selects the receiving device using a single tap finger gesture. In other embodiments, the user selects the receiving device using a double tap finger gesture. In some embodiments, a user selects one or more receiving devices using a single tap finger gesture, and initiates the transfer to the one or more devices with a secondary flicking gesture.

Figure 5:
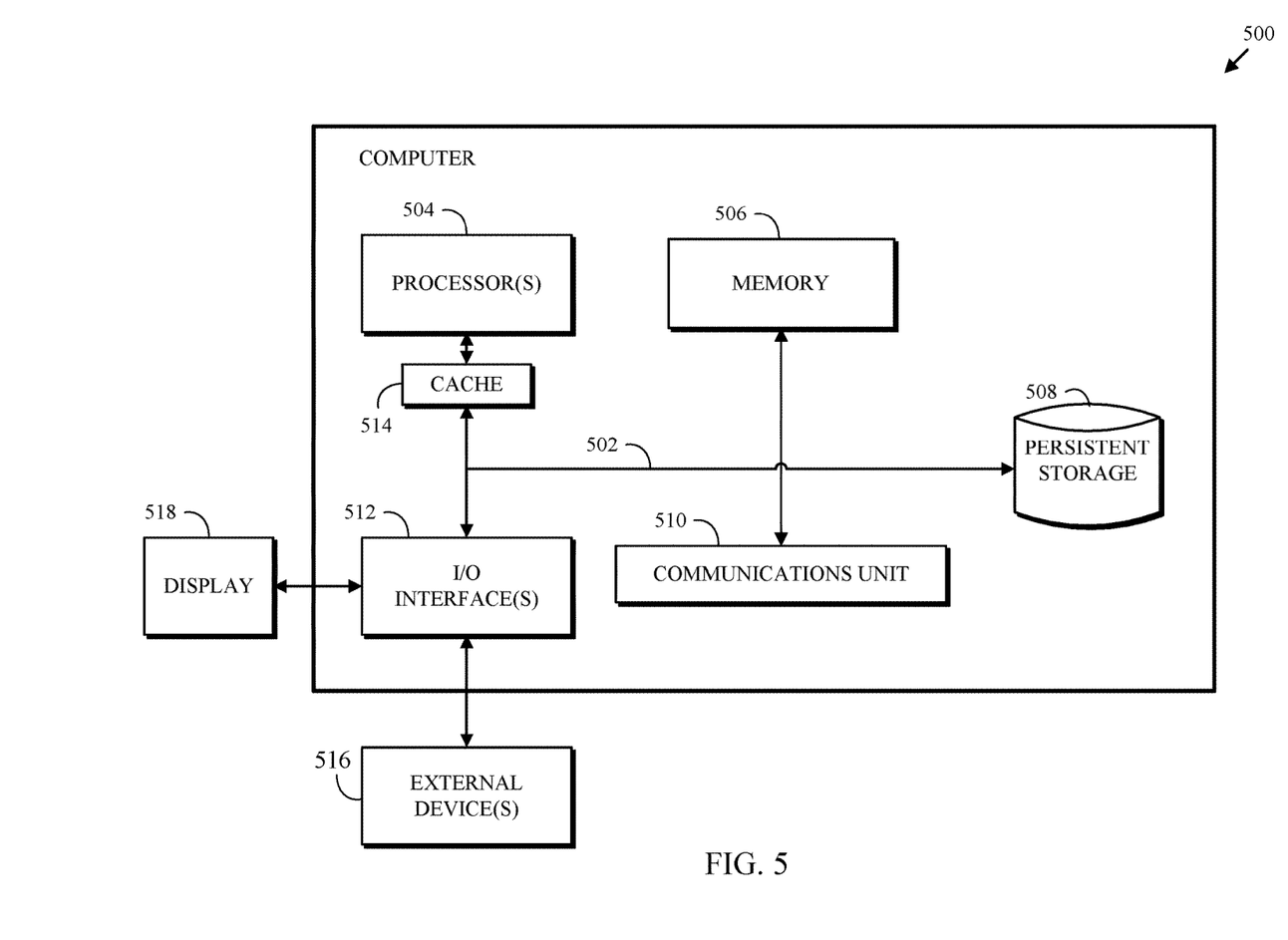
FIG. 5 is a functional block diagram depicting various components of one embodiment of a computer suitable for executing the methods disclosed herein.

FIG. 5 depicts a functional block diagram of components of a computer system 500, which is an example of systems such as computer 110A, computer 110B, printer 130, smart device 140, and laptop computer 150 within computing environment 100 of FIG. 1, in accordance with at least one embodiment of the present invention. It should be appreciated that FIG. 5 provides only an illustration of one implementation and does not imply any limitations with regard to the environments in which different embodiments can be implemented. Many modifications to the depicted environment can be made.

Computer 110A, computer 110B, printer 130, smart device 140, and laptop computer 150 include processor(s) 504, cache 514, memory 506, persistent storage 508, communications unit 510, input/output (I/O) interface(s) 512 and communications fabric 502. Communications fabric 502 provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data, and data near recently accessed data, from memory 506.

Program instructions and data used to practice embodiments of the present invention, e.g., surface profile method 200, are stored in persistent storage 508 for execution and/or access by one or more of the respective processor(s) 504 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of 110A, computer 110B, printer 130, smart device 140, and laptop computer 150. In these examples, communications unit 510 includes one or more network interface cards. Communications unit 510 may provide communications through the use of either or both physical and wireless communications links. Program instructions and data used to practice embodiments of surface profile method 200 may be downloaded to persistent storage 508 through communications unit 510.

I/O interface(s) 512 allows for input and output of data with other devices that may be connected to each computer system. For example, I/O interface(s) 512 may provide a connection to external device(s) 516 such as a keyboard, a keypad, a touch screen, a microphone, a digital camera, and/or some other suitable input device. External device(s) 516 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising the steps of:
    detecting a gesture applied to a flexible touch display that corresponds to an object, wherein the object is provided with a security level selected from three or more security levels;
    determining a direction for the gesture;
    determining if a gesture pressure is greater than a threshold pressure required to move the object, wherein the threshold pressure for the object is selected from three or more pressure levels that correspond to the three or more security levels;
    determining a surface profile of the flexible touch display comprising a degree of incline of the flexible touch display and selecting a rate of transfer corresponding to the degree of incline;
    determining if a surface profile of a receiving device is compatible with the surface profile of the flexible touch display, wherein the surface profile of the receiving device is not compatible if the surface profile of the flexible touch display is bent vertically at a 90 degree angle and prevents data transfer with the surface profile of the receiving device; and
    transferring the object to the receiving device, in response to determining the surface profile of the receiving device is compatible with the surface profile of the flexible touch display, wherein a wireless communication link is established between the surface profile of the receiving device and the surface profile of the flexible touch display for transferring the object.

2. The method of claim 1, wherein the object comprises a collection of items selected by deforming the flexible touch display to create a dip in the flexible touch display.

3. The method of claim 1, wherein the surface profile comprises an angle of incline of an edge of the flexible touch display in the direction of the gesture.

4. The method of claim 1, further comprising determining the rate of transfer according to the surface profile of the receiving device, wherein a magnitude of deformation of the display is proportional to a rate of transfer.

5. The method of claim 1, wherein determining if the surface profile of the receiving device is compatible with the surface profile of the flexible touch display enables automatic pairing of the receiving device and the flexible touch display.

6. A computer program product comprising:
    one or more computer readable storage media and program instructions stored on the one or more computer readable storage media, the program instructions comprising instructions executable by a computer to perform:

detecting a gesture applied to a flexible touch display that corresponds to an object, wherein the object is provided with a security level selected from three or more security levels;

determining a direction for the gesture;

determining if a gesture pressure is greater than a threshold pressure required to move the object, wherein the threshold pressure for the object is selected from three or more pressure levels that correspond to the three or more security levels;

determining a surface profile of the flexible touch display comprising a degree of incline of the flexible touch display and selecting a rate of transfer corresponding to the degree of incline;

determining if a surface profile of a receiving device is compatible with the surface profile of the flexible touch display, wherein the surface profile of the receiving device is not compatible if the surface profile of the flexible touch display is bent vertically at a 90 degree angle and prevents data transfer with the surface profile of the receiving device; and transferring the object to the receiving device, in response to determining the surface profile of the receiving device is compatible with the surface profile of the flexible touch display, wherein a wireless communication link is established between the surface profile of the receiving device and the surface profile of the flexible touch display for transferring the object.

7. The computer program product of claim 6, wherein the object comprises a collection of items selected by deforming the flexible touch display to create a dip in the flexible touch display.

8. The computer program product of claim 6, wherein the surface profile comprises an angle of incline of an edge of the flexible touch display in the direction of the gesture.

9. The computer program product of claim 6, further comprising determining the rate of transfer according to the surface profile of the receiving device, wherein a magnitude of deformation of the display is proportional to a rate of transfer.

10. The computer program product of claim 6, wherein determining if the surface profile of the receiving device is compatible with the surface profile of the flexible touch display enables automatic pairing of the receiving device and the flexible touch display.

11. A computer system comprising:
one or more computer processors;
one or more computer readable storage media;
program instructions stored on the computer readable storage media for execution by at least one of the computer processors, the program instructions comprising instructions to perform:

detecting a gesture applied to a flexible touch display that corresponds to an object, wherein the object is provided with a security level selected from three or more security levels;

determining a direction for the gesture;

determining if a gesture pressure is greater than a threshold pressure required to move the object, wherein the threshold pressure for the object is selected from three or more pressure levels that correspond to the three or more security levels;

determining a surface profile of the flexible touch display comprising a degree of incline of the flexible touch display and selecting a rate of transfer corresponding to the degree of incline;

determining if a surface profile of a receiving device is compatible with the surface profile of the flexible touch display, wherein the surface profile of the receiving device is not compatible if the surface profile of the flexible touch display is bent vertically at a 90 degree angle and prevents data transfer with the surface profile of the receiving device; and transferring the object to the receiving device, in response to determining the surface profile of the receiving device is compatible with the surface profile of the flexible touch display, wherein a wireless communication link is established between the surface profile of the receiving device and the surface profile of the flexible touch display for transferring the object.

12. The computer system of claim 11, wherein the object comprises a collection of items selected by deforming the flexible touch display to create a dip in the flexible touch display.

13. The computer system of claim 11, wherein the surface profile comprises an angle of incline of an edge of the flexible touch display in the direction of the gesture.

14. The computer system of claim 11, further comprising determining the rate of transfer according to the surface profile of the receiving device, wherein a magnitude of deformation of the display is proportional to a rate of transfer.

15. The computer system of claim 11, wherein determining if the surface profile of the receiving device is compatible with the surface profile of the flexible touch display enables automatic pairing of the receiving device and the flexible touch display.

* * * * *